(12) United States Patent
Istok et al.

(10) Patent No.: US 10,232,789 B2
(45) Date of Patent: Mar. 19, 2019

(54) INTEGRATED LATCH/BUMPER COMBINATION

(71) Applicant: FORD GLOBAL TECHNOLOGIES, LLC, Dearborn, MI (US)

(72) Inventors: Michael Istok, Macomb, MI (US); Anna Miller Hill, Belleville, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/373,806

(22) Filed: Dec. 9, 2016

(65) Prior Publication Data
US 2018/0162285 A1    Jun. 14, 2018

(51) Int. Cl.
| | |
|---|---|
| E05B 77/36 | (2014.01) |
| B60R 7/06 | (2006.01) |
| E05B 83/30 | (2014.01) |
| E05B 83/32 | (2014.01) |
| E05F 5/06 | (2006.01) |
| E05B 77/38 | (2014.01) |
| E05C 19/02 | (2006.01) |

(52) U.S. Cl.
CPC ............... B60R 7/06 (2013.01); E05B 77/36 (2013.01); E05B 77/38 (2013.01); E05B 83/30 (2013.01); E05B 83/32 (2013.01); E05F 5/06 (2013.01); E05C 19/022 (2013.01)

(58) Field of Classification Search
USPC ...................................................... 296/37.12
See application file for complete search history.

(56) References Cited

U.S. PATENT DOCUMENTS

| | | | | |
|---|---|---|---|---|
| 2,006,922 A | * | 7/1935 | Jacobi | E05B 63/22 70/141 |
| 2,153,110 A | * | 4/1939 | Waterbury | E05F 5/06 16/86 A |
| 2,414,662 A | * | 1/1947 | Ostrom | E05C 19/063 16/85 |
| 2,530,365 A | * | 11/1950 | Johnson | E05C 17/52 16/85 |
| 2,847,240 A | * | 8/1958 | Stone | E05C 19/066 285/919 |

(Continued)

FOREIGN PATENT DOCUMENTS

| | | | | |
|---|---|---|---|---|
| EP | 1512595 A1 | * | 3/2005 | ............. B60S 1/528 |
| JP | 2000008673 A | | 1/2000 | |

(Continued)

OTHER PUBLICATIONS

Integrated defined—https://www.bing.com/search?q=define+integrated&src=IE-SearchBox&FORM=IESR3N (Year: 2018).*

(Continued)

*Primary Examiner* — Hilary L Gutman
(74) *Attorney, Agent, or Firm* — Vichit Chea; King & Schickli PLLC

(57) ABSTRACT

A latch assembly for a vehicle bin includes a latch housing having an integrated bumper. The latch housing defines a latch opening and a base adapted to carry the bumper. The bumper includes a load edge and is disposed on the base to provide a constant load around the latch opening. The load edge may define one of a planar load edge, a serrated load edge, and a scalloped load edge.

14 Claims, 5 Drawing Sheets

(56) References Cited

U.S. PATENT DOCUMENTS

| | | | | |
|---|---|---|---|---|
| 2,848,272 A * | 8/1958 | Storch | B62D 25/12 | |
| | | | 16/86 A | |
| 2,882,548 A * | 4/1959 | Roethel | E05C 17/206 | |
| | | | 16/86 R | |
| 2,933,794 A * | 4/1960 | Biesecker | F16B 5/125 | |
| | | | 292/DIG. 38 | |
| 2,946,612 A * | 7/1960 | Ahlgren | E05C 19/066 | |
| | | | 24/662 | |
| 2,967,324 A * | 1/1961 | Gagnier | E05F 5/022 | |
| | | | 16/86 A | |
| 3,038,747 A * | 6/1962 | Rapata | E05C 19/066 | |
| | | | 135/119 | |
| 3,103,378 A * | 9/1963 | Ahlgren | E05C 19/066 | |
| | | | 16/85 | |
| 3,466,075 A * | 9/1969 | Wurster | E05C 19/066 | |
| | | | 292/19 | |
| 3,768,115 A * | 10/1973 | Hoffmann | F16C 11/04 | |
| | | | 16/2.1 | |
| 3,776,580 A * | 12/1973 | James | E05C 19/066 | |
| | | | 292/17 | |
| 4,022,504 A * | 5/1977 | Anderson | E05C 19/06 | |
| | | | 292/17 | |
| 4,527,821 A * | 7/1985 | Tanaka | E05C 19/06 | |
| | | | 24/297 | |
| 4,544,192 A * | 10/1985 | Angle | E05B 15/0245 | |
| | | | 292/341.18 | |
| 4,742,984 A * | 5/1988 | Cote | B60N 2/015 | |
| | | | 221/4 | |
| 4,779,906 A * | 10/1988 | Kurosaki | E05C 19/022 | |
| | | | 292/19 | |
| 4,813,724 A * | 3/1989 | Dietrich | E05B 15/022 | |
| | | | 292/341.12 | |
| 4,822,092 A * | 4/1989 | Sweers | B60N 2/015 | |
| | | | 24/662 | |
| 4,917,413 A * | 4/1990 | Jason | E05C 19/066 | |
| | | | 292/76 | |
| 5,000,496 A * | 3/1991 | Miskech | E05B 83/16 | |
| | | | 292/225 | |
| 5,092,550 A * | 3/1992 | Bettini | E05F 5/022 | |
| | | | 248/188.4 | |
| 5,170,985 A * | 12/1992 | Killworth | B60G 99/004 | |
| | | | 248/634 | |
| 5,397,206 A * | 3/1995 | Sihon | F02B 77/005 | |
| | | | 411/369 | |
| 5,484,178 A * | 1/1996 | Sandhu | E05B 83/30 | |
| | | | 292/169 | |
| 5,689,853 A * | 11/1997 | Lemmer | E05C 17/50 | |
| | | | 16/82 | |
| 5,694,719 A * | 12/1997 | Bejune | B60J 5/0402 | |
| | | | 411/182 | |
| 5,765,882 A * | 6/1998 | Trauscht | E05F 5/022 | |
| | | | 292/1 | |
| 5,918,918 A * | 7/1999 | Mosley | E05B 77/38 | |
| | | | 292/341.12 | |
| 6,088,878 A * | 7/2000 | Antonucci | E05F 5/022 | |
| | | | 16/86 A | |
| 6,119,306 A * | 9/2000 | Antonucci | E05F 5/022 | |
| | | | 16/86 A | |
| 6,189,959 B1 * | 2/2001 | VanAssche | B60K 15/05 | |
| | | | 16/86 B | |
| 6,206,455 B1 * | 3/2001 | Faubert | B60J 5/06 | |
| | | | 16/86 B | |
| 6,527,471 B2 * | 3/2003 | Smith | F16B 2/20 | |
| | | | 24/293 | |
| 7,108,298 B2 * | 9/2006 | Huet | E05C 19/022 | |
| | | | 292/19 | |
| 8,590,973 B2 * | 11/2013 | Matsuura | B60N 2/366 | |
| | | | 292/216 | |
| 8,955,890 B2 | 2/2015 | Meidinger et al. | | |
| 9,562,376 B2 * | 2/2017 | Dey | E05B 77/38 | |
| 2005/0253398 A1 * | 11/2005 | Schubring | E05F 5/022 | |
| | | | 292/1 | |
| 2006/0097550 A1 * | 5/2006 | Wang | E05F 5/022 | |
| | | | 296/207 | |
| 2006/0180964 A1 * | 8/2006 | Siemer | E05F 5/022 | |
| | | | 267/140 | |
| 2006/0200939 A1 * | 9/2006 | Schubring | E05F 7/04 | |
| | | | 16/86 R | |
| 2006/0242789 A1 * | 11/2006 | Mokashi | E05F 5/022 | |
| | | | 16/85 | |
| 2006/0267354 A1 * | 11/2006 | Petrus Van Den Heuvel | | |
| | | | E05C 17/203 | |
| | | | 292/262 | |
| 2007/0114802 A1 | 5/2007 | Johnson et al. | | |
| 2009/0243172 A1 * | 10/2009 | Ting | F16F 1/3732 | |
| | | | 267/141.1 | |
| 2010/0283271 A1 * | 11/2010 | Hemingway | E05B 85/045 | |
| | | | 292/341.15 | |
| 2010/0314890 A1 * | 12/2010 | Hemingway | E05B 81/22 | |
| | | | 292/341.16 | |
| 2011/0025078 A1 * | 2/2011 | Gentile | E05B 85/045 | |
| | | | 292/341.12 | |
| 2013/0249220 A1 * | 9/2013 | Paskonis | E05B 17/0033 | |
| | | | 292/95 | |
| 2014/0338167 A1 * | 11/2014 | Jackson, Jr. | B60J 5/101 | |
| | | | 29/418 | |
| 2015/0354259 A1 * | 12/2015 | Broadhead | E05F 5/06 | |
| | | | 16/82 | |
| 2016/0076294 A1 * | 3/2016 | Alexander | E05F 5/022 | |
| | | | 16/86 R | |

FOREIGN PATENT DOCUMENTS

| | | | | |
|---|---|---|---|---|
| JP | 2011084168 A * | 4/2011 | | B60R 19/023 |
| KR | 2006062593 A | 6/2006 | | |

OTHER PUBLICATIONS

Housing defined—https://www.bing.com/search?q=define%3A+housing&src=IE-SearchBox&FORM=IESR3N (Year: 2018).*

English Machine Translation of JP2000008673A.

English Machine Translation of KR2006062593A.

\* cited by examiner

INTEGRATED LATCH/BUMPER COMBINATION

TECHNICAL FIELD

This document relates generally to closures for automotive interior bins. In particular, the document relates to latching mechanisms for automotive bin closures, the latching mechanisms including integrated bumpers.

BACKGROUND

With reference to FIG. 1, conventional vehicle storage bins 100 typically include a housing 110 defining a storage bin opening 120 and a bin closure frame 130, and a closure assembly 140. The storage bin 100 will further typically be provided with a latch mechanism 150 to retain the closure assembly 140 in a closed orientation. For such storage bins 100 utilizing a latch mechanism 150 such as a push-push latch to secure the closure assembly 140, typically bumpers 160 made of rubber or other resilient material are provided. The bumpers provide a number of desirable effects, including providing an opposing force to the bias applied by the latch mechanism to reduce or eliminate rattles, preventing excessive over-travel, providing custom opening and closing efforts, and preventing the closure assembly from opening undesirably under high G loads.

For a center-mounted latch mechanism 150 as is shown in FIG. 1, at least two bumpers are 160 are required to produce an equal distribution of force to either side of the latch mechanism 150. This prevents the closure assembly 140 from rocking within the bin closure frame 130, which would be perceived by the consumer as a problem with fit and finish. Other features such as bin closure scallops 170 for swing clearance of the bumpers 160, but are generally viewed as negatively impacting craftsmanship.

While effective, such measures increase cost and complexity of vehicle storage bin construction. In particular, use of features such as multiple bumpers 160 and bin closure scallops 170 increase material cost and part complexity for storage bin 100 fabrication. Use of multiple bumpers 160 introduces multiple bumper marring areas to the storage bin 100 construction, and also introduces a requirement for increased complexity in the process of bumper installation as well as various verification systems or operating procedures for bumper presence during storage bin 100 assembly. Multiple bumpers 160 may create inconsistent loading due to part to part variability. Further, conventional bumpers 160 can easily be improperly installed as to orientation and/or selection of an incorrect bumper. Use of individual bumpers 160 further requires a robust closure assembly 140 to withstand loading at the bumper interface, which increases material usage and cost. Still yet more, conventional solutions to the above problems comprising poke yoke such as vision systems and part lock outs are complex and expensive.

To solve this and other problems, this document relates to a latch assembly for a vehicle storage bin, comprising a latch mechanism having an integrated bumper.

SUMMARY

In accordance with the purposes and benefits described herein, a latch assembly for a vehicle bin is provided, comprising a latch housing including an integrated bumper. The latch housing defines a latch opening and a base adapted to carry the bumper. The bumper is disposed on the base to provide a constant load around the latch opening. In embodiments, the latch housing carries a latch mechanism defining a push-push latch.

The bumper includes a load edge. In embodiments, the load edge defines one of a planar load edge, a serrated load edge, and a scalloped load edge. The bumper may further include at least one retainer for securing the bumper to the base.

In another aspect, a closure assembly for a vehicle bin is provided, comprising a closure panel and a latch assembly as described above, carried by the closure panel.

In yet another aspect, a storage bin assembly for a vehicle is provided, comprising a storage bin, a storage bin closure panel, and a latch assembly as described above, carried by the bin closure panel. In embodiments, the storage bin comprises a center-mounted latch assembly carried by the storage bin closure panel.

In the following description, there are shown and described several preferred embodiments of the described latch assembly, and storage bin closure assemblies and storage bin assemblies incorporating same. As it should be realized, the latch assembly is capable of other, different embodiments and its several details are capable of modification in various, obvious aspects all without departing from the devices as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the described latch assembly and together with the description serve to explain certain principles thereof. In the drawing figures.

Reference will now be made in detail to embodiments of the disclosed latch assembly, examples of which are illustrated in the accompanying drawing figures wherein like reference numerals indicate like features.

DETAILED DESCRIPTION

Figure 1:
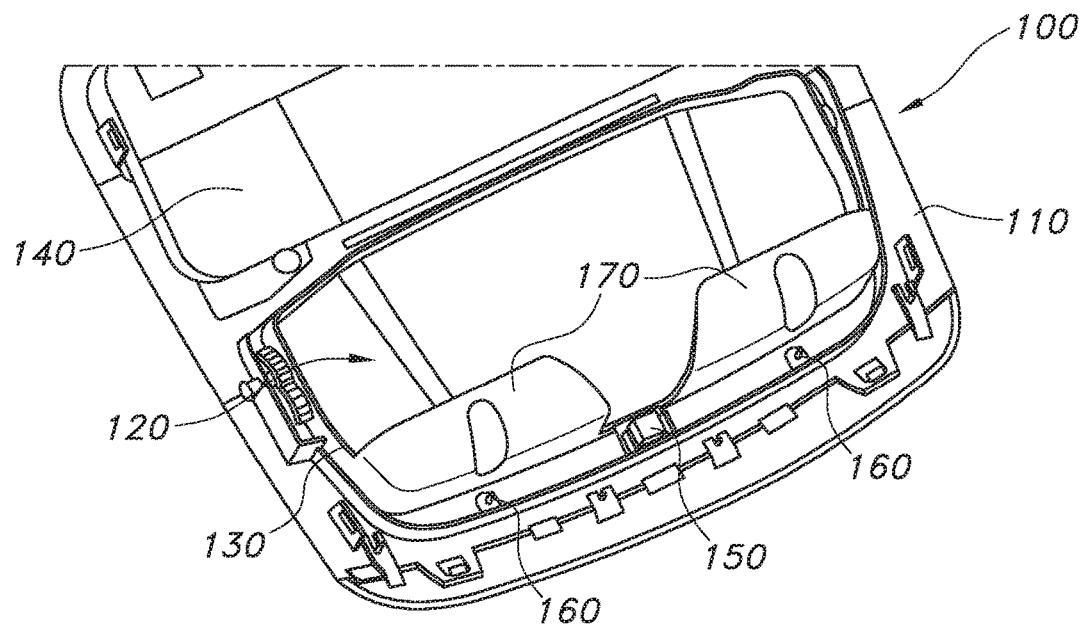
FIG. 1 shows a top perspective view of a prior art storage bin.
Figure 2:
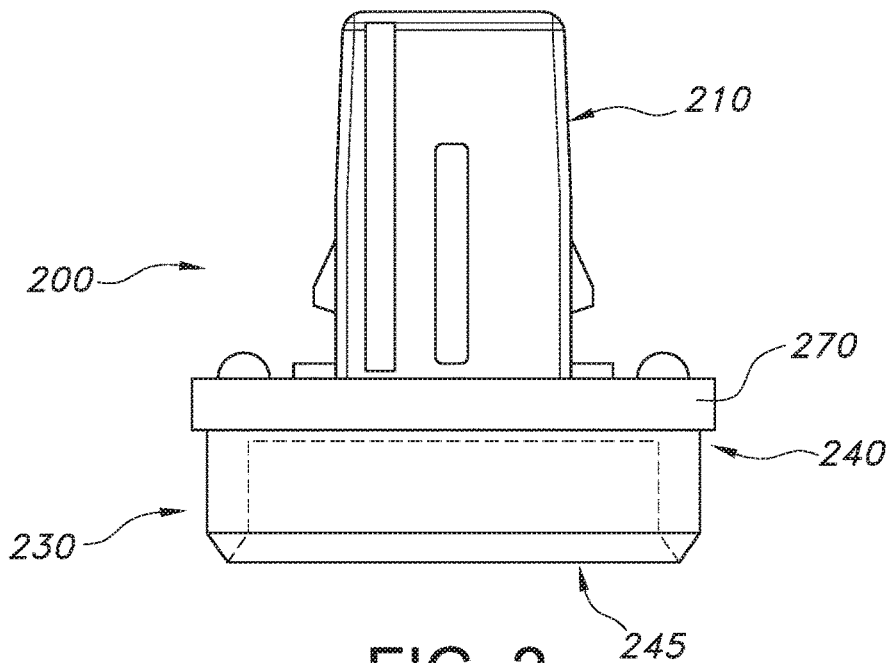
FIG. 2 is a side view of a latch assembly according to the present disclosure.
Figure 3:
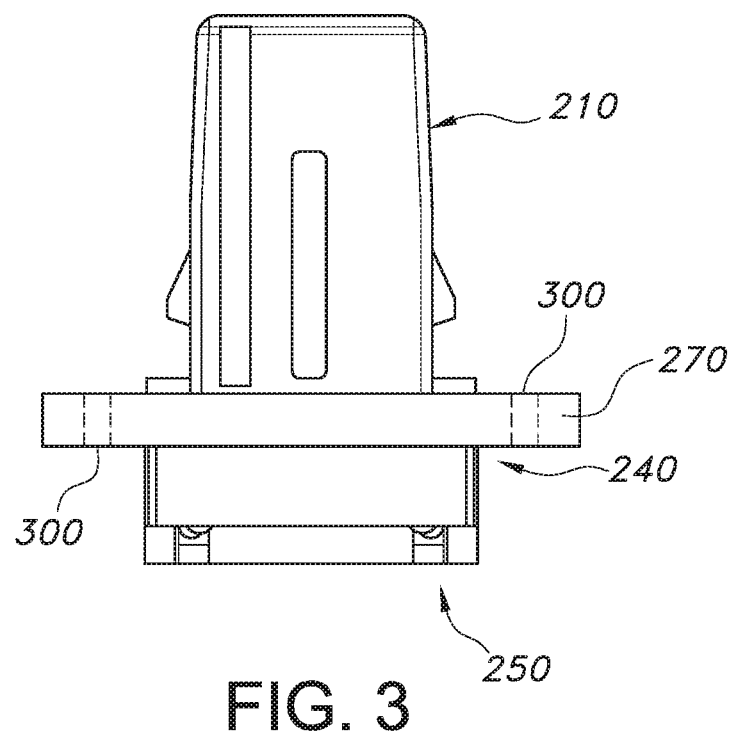
FIG. 3 is a side view of a latch housing for use in the latch assembly of FIG. 2.

FIG. 2 depicts an embodiment of a latch assembly 200 according to the present disclosure. As shown, the latch assembly 200 includes a latch housing 210 holding a latch mechanism 220 (see FIG. 4) and an integrated bumper 230 defined by a body 235 of resilient material defining a central opening 245 (see FIGS. 2, 4 and 5A-5E). In the depicted embodiment, the latch mechanism 220 is a push-push latch mechanism as is known in the art, although other latch mechanism designs are contemplated. With reference to FIG. 3, the latch housing 210 includes a base 240 which as will be described in greater detail is adapted whereby in the assembled device the bumper body 235 is concentrically disposed about a latch opening 250 defined by the base 240.

Figure 4:
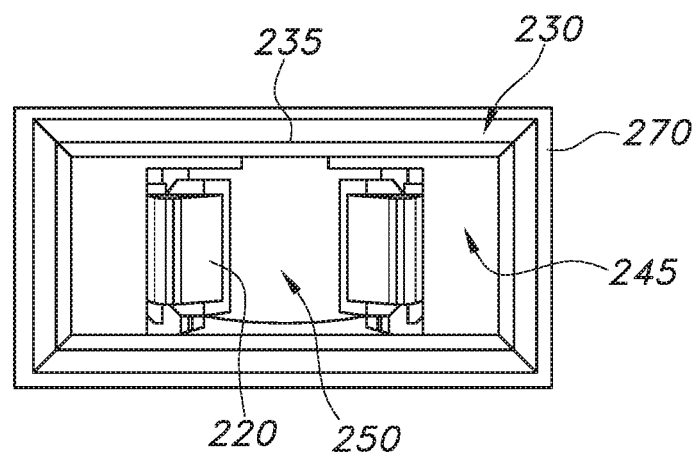
FIG. 4 is a bottom view of the latch assembly of FIG. 2.

As shown in FIG. 4, the bumper 230 is disposed on the base 240 to concentrically surround the latch opening 250. As will be described below, this allows the bumper 230 to provide a constant load around the latch opening 250 perimeter, i.e. in a 360 degree circumference around the latch opening 250 and therefore in a 360 degree circumference around a latch interface defined between a closure assembly (not shown) and a cooperating storage bin assembly (not shown). As will also be appreciated, the latch housing 210 may be molded by any suitable molding technique in a first shot and the bumper 230 may be molded in a second shot, or alternatively the latch housing may be molded in a first shot and placed in an appropriate secondary tooling for insert molding of the bumper.

Figure 5A:
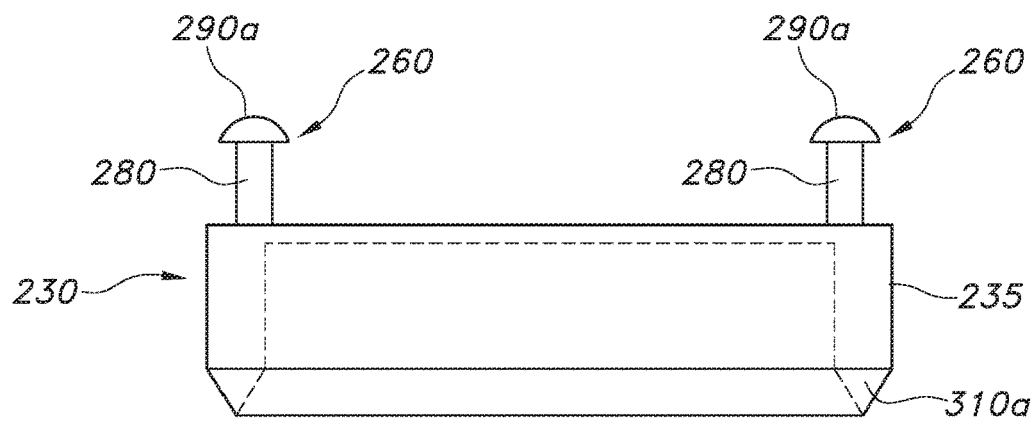
FIG. 5A shows an embodiment of a bumper for use in the latch assembly of FIG. 2.
Figure 5B:
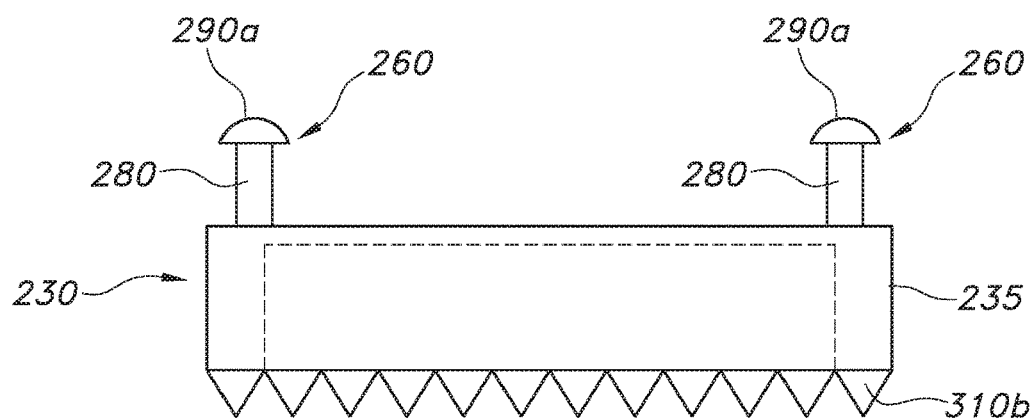
FIG. 5B shows another embodiment of a bumper for use in the latch assembly of FIG. 2.
Figure 5C:
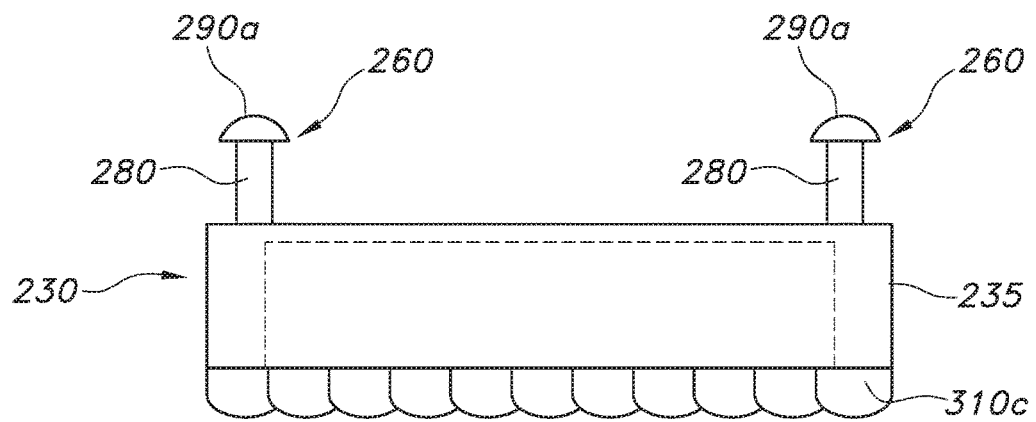
FIG. 5C shows yet another embodiment of a bumper for use in the latch assembly of FIG. 2.
Figure 5D:
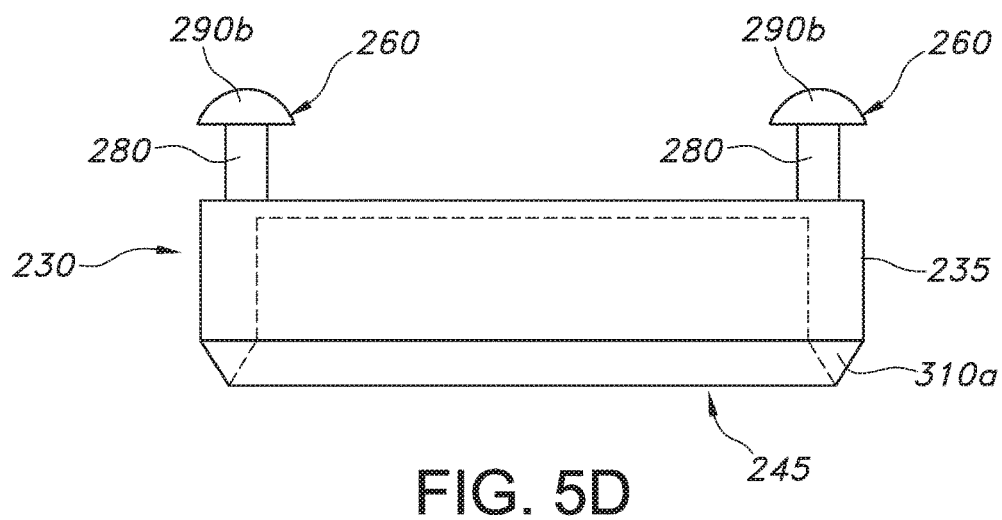
FIG. 5D shows yet still another embodiment of a bumper for use in the latch assembly of FIG. 2.
Figure 5E:
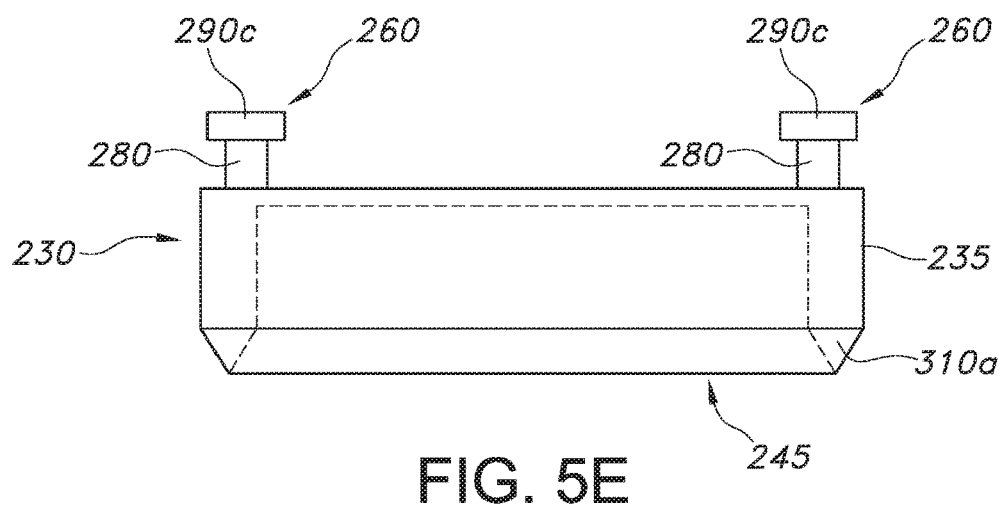
FIG. 5E shows yet still another embodiment of a bumper for use in the latch assembly of FIG. 2.
Figure 6:
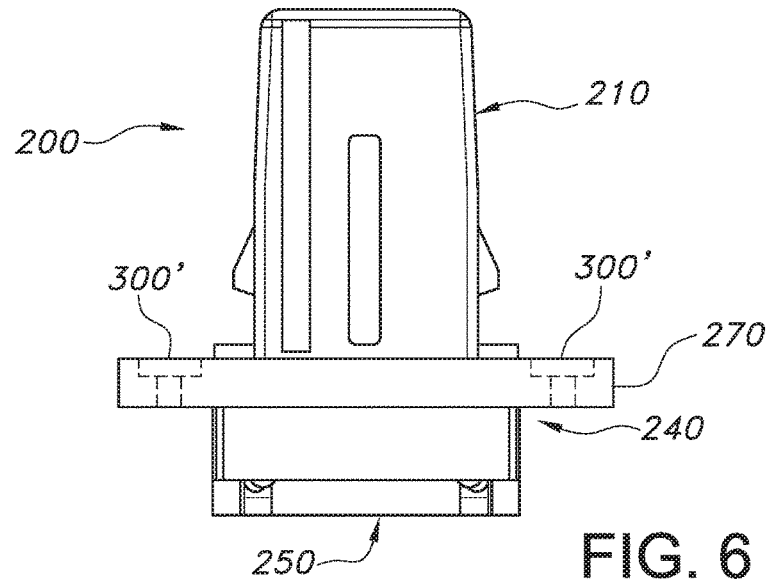
FIG. 6 shows an alternative embodiment of the latch housing of FIG. 3.

The bumper 230 includes a number of useful features. With reference to FIGS. 5A-5E and representatively referencing FIG. 5A, the bumper 230 is defined by the body 235 configured to concentrically surround a latch opening 250 defined by the base 240 as described above, and further includes at least one retainer 260 configured to provide a secure connection to a flange 270 of the base by way of cooperating apertures 300 (see FIGS. 3 and 6). The retainer 260 is defined by a post 280 extending from the body 235 and terminating in a head 290 which may comprise a variety of configurations including without intending any limitation a round head 290$a$ (FIGS. 5A-5C), a larger round or "mushroom" head 290$b$ (FIG. 5D), and a flat head 290$c$ (FIG. 5E). The flat head 290$c$ is contemplated for use in an alternative embodiment of a latch assembly 200 comprising a base flange 270 having cooperating apertures 300', as shown in FIG. 6 being configured to provide a recessed connection between the bumper 230 and the flange 270. As will be appreciated, these features allow tuning a clamp load applied to the bumper 230 by altering the amount of the load and the load distribution, all without requiring any change in material.

In turn, the bumper body 235 includes a load edge 310 which likewise may comprise a number of configurations. In embodiments, the load edge may be defined as a planar load edge 310$a$ (FIGS. 5A and 5D-5E), as a serrated load edge 310$b$ (FIG. 5B), and as a scalloped load edge 310$c$ (FIG. 5C). As will be appreciated, each of these load edge 310 configurations, by altering the number of contacts/spacing of contacts between the load edge and a latch interface (not shown), will provide a different load at the latch interface to customize the "feel" of opening and closing a storage bin closure provided with the latch assembly 200 as described herein.

Figure 7:
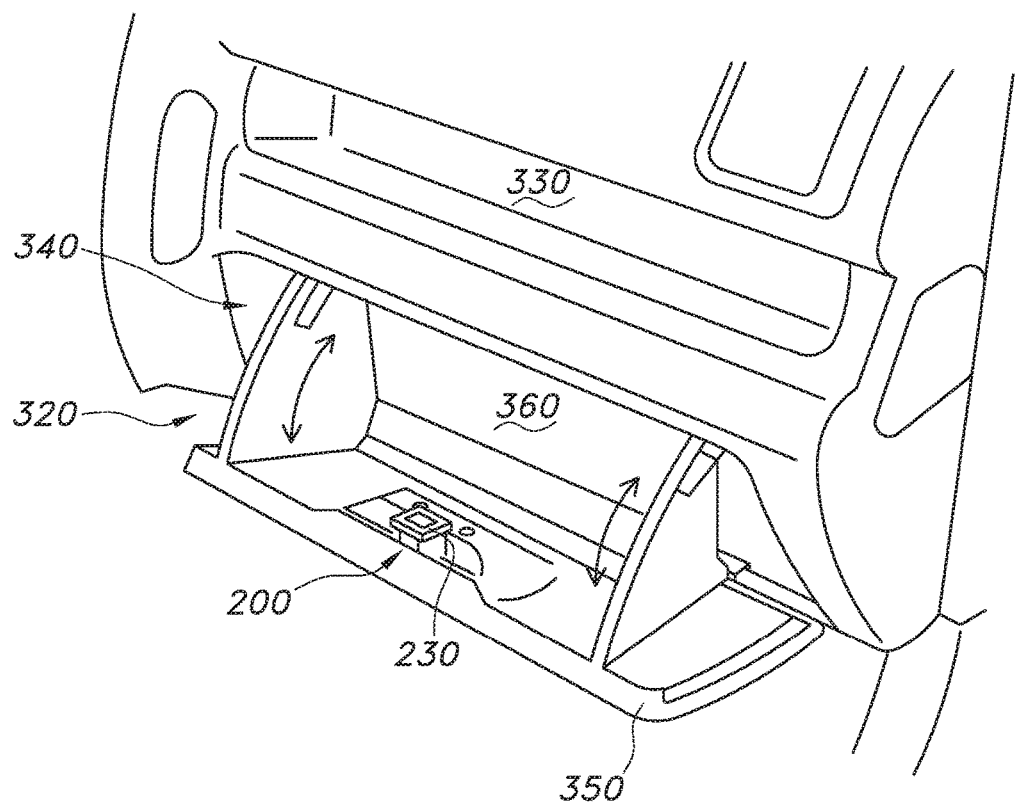
FIG. 7 shows a storage bin provided with the latch assembly of FIG. 2.

With reference to FIG. 7, the latch assembly 200 described herein is shown associated with a storage bin assembly 320. In the depicted embodiment, the storage bin assembly 320 is configured as a glove compartment disposed in a vehicle dashboard 330. The storage bin assembly 320 comprises a housing 340 (partially obscured by the dashboard 330 in this view) holding a pivoting closure panel 350 which is in turn configured to support or even define a storage bin 360. The closure panel 350 carries a latch assembly 200 as described above whereby the bumper 230 is oriented to contact a latch interface surface (not visible in this view) when the closure panel is pivoted to a closed orientation (see arrows).

As will be appreciated, by use of the described latch assembly 200 numerous benefits accrue. By avoiding the need for multiple bumpers, complexity and cost of fabrication are reduced. In turn, by use of a single integrated bumper 230 as described, excessive tolerance stack as is encountered with multiple bumpers is prevented, improving fit and finish. Still more, by inclusion of the integrated bumper 230 as described, the latch mechanism 220 and associated internal components are protected during installation in a storage bin assembly 320. Still yet more, by inclusion of the integrated bumper 230 craftsmanship and quality are improved due to reduced componentry. By reducing componentry, concomitantly design concessions are reduced which would otherwise be required to accommodate additional components.

The foregoing has been presented for purposes of illustration and description. It is not intended to be exhaustive or to limit the embodiments to the precise form disclosed. Obvious modifications and variations are possible in light of the above teachings. For example, the latch assembly 200 has in the present document been described in the environment of a storage bin assembly 320 including a storage bin 360 configured as a glove compartment or other storage bin pivoting outwardly and downwardly from a dashboard 330. However, as will be appreciated, the described latch assembly 200 is equally adaptable to any vehicle storage bin assembly 320, including without intending any limitation an overhead bin associated with a vehicle roof panel or headliner, a door-mounted bin, a console-mounted bin, and others. Further, while a pivoting closure panel 350 defining a storage bin 360 is depicted herein, the latch assembly 200 is equally adaptable to a fixed storage bin having a pivoting closure panel associated therewith, to a sliding storage bin which slides between an open and a closed configuration along a vehicle y- or z-axis, and others.

Further, as depicted herein the latch assembly 200 comprises a push-push latch mechanism 220. However, it will be appreciated that the described latch assembly and associated features and benefits are equally adaptable to other center-mounted latch mechanisms, to offset latch mechanisms, and others. All such modifications and variations are within the scope of the appended claims when interpreted in accordance with the breadth to which they are fairly, legally and equitably entitled.

What is claimed:

1. A latch assembly for a vehicle bin, comprising a latch housing defining a latch opening and a base adapted to carry an integrated bumper having a body defining a central through-bore;
   wherein the bumper further includes at least one press-fit retainer for securing the bumper to the base.

2. The latch assembly of claim 1, wherein the bumper is disposed on the base whereby the body is concentrically disposed about the latch opening to provide a constant load around the latch opening.

3. The latch assembly of claim 1, wherein the bumper includes a load edge.

4. The latch assembly of claim 3, wherein the load edge defines one of a planar load edge, a serrated load edge, and a scalloped load edge.

5. The latch assembly of claim 1, wherein the latch housing carries a latch mechanism defining a push-push latch.

6. A closure assembly for a vehicle bin, comprising:
a closure panel; and
a latch assembly carried by the closure panel;
wherein the latch assembly comprises a latch housing defining a latch opening and a base adapted to carry an integrated bumper having a body defining a central through-bore;
further wherein the bumper includes at least one press-fit retainer for securing the bumper to the base.

7. The closure assembly of claim 6, wherein the bumper is disposed on the base whereby the body is concentrically disposed about the latch opening to provide a constant load around the latch opening.

8. The closure assembly of claim 6, wherein the bumper includes a load edge.

9. The closure assembly of claim 8, wherein the load edge defines one of a planar load edge, a serrated load edge, and a scalloped load edge.

10. A storage bin assembly for a vehicle, comprising:
a storage bin;
a storage bin closure panel; and
a latch assembly carried by the bin closure panel;
wherein the latch assembly comprises a latch housing defining a latch opening and a base adapted to carry an integrated bumper having a body defining a central through-bore;
further wherein the bumper includes at least one press-fit retainer for securing the bumper to the base.

11. The storage bin assembly of claim 10, wherein the bumper is disposed on the base whereby the body is concentrically disposed about the latch opening to provide a constant load around the latch opening.

12. The storage bin assembly of claim 10, wherein the bumper includes a load edge.

13. The storage bin assembly of claim 12, wherein the load edge defines one of a planar load edge, a serrated load edge, and a scalloped load edge.

14. The storage bin assembly of claim 10, comprising a center-mounted latch assembly carried by the storage bin closure panel.

* * * * *